US012625652B2

(12) United States Patent
Ogawa et al.

(10) Patent No.: US 12,625,652 B2
(45) Date of Patent: May 12, 2026

(54) IMAGE FORMING SYSTEM AND IMAGE FORMING APPARATUS

(71) Applicant: KYOCERA Document Solutions Inc., Osaka (JP)

(72) Inventors: Shinya Ogawa, Osaka (JP); Yoshitaka Kishi, Osaka (JP); Yosuke Morishita, Osaka (JP); Kenichi Katsura, Osaka (JP)

(73) Assignee: Kyocera Document Solutions, Inc. (JP)

( * ) Notice: Subject to any disclaimer, the term of this patent is extended or adjusted under 35 U.S.C. 154(b) by 288 days.

(21) Appl. No.: 18/630,970

(22) Filed: Apr. 9, 2024

(65) Prior Publication Data

US 2024/0345778 A1 Oct. 17, 2024

(30) Foreign Application Priority Data

Apr. 13, 2023 (JP) ................................. 2023-065739

(51) Int. Cl.
*G06F 3/12* (2006.01)
(52) U.S. Cl.
CPC .......... *G06F 3/1204* (2013.01); *G06F 3/1288* (2013.01)

(58) Field of Classification Search
USPC ....................................................... 358/1.15
See application file for complete search history.

(56) References Cited

U.S. PATENT DOCUMENTS

2014/0022591 A1* 1/2014 Asahara ................. G06F 3/123
358/1.15
2020/0344363 A1 10/2020 Morishita

FOREIGN PATENT DOCUMENTS

JP 2020-182097 11/2020

* cited by examiner

*Primary Examiner* — Jacky X Zheng

(57) ABSTRACT

A management server stores box data received from an image forming apparatus as an export side, generates box configuration data that indicates the box data, upon receiving an import request of the box data from an image forming apparatus as an import side, transmits the box configuration data, and transmits the box data after the transmission of the box configuration data. The image forming apparatus as the import side transmits the import request, receives and saves the box configuration data and thereby registers the box configuration data to the box function, and receives and saves the box data after the receipt and the saving of the box configuration data. The image forming apparatus as the import side displays a list of the box data regardless of whether the box data has been received or not after registering the box configuration data.

4 Claims, 4 Drawing Sheets

FIG. 2

IMAGE FORMING SYSTEM AND IMAGE FORMING APPARATUS

CROSS-REFERENCE TO RELATED APPLICATIONS

This application relates to and claims priority rights from Japanese Patent Application No. 2023-065739, filed on Apr. 13, 2023, the entire disclosures of which are hereby incorporated by reference herein.

BACKGROUND

1. Field of the Present Disclosure

The present disclosure relates to an image forming system and an image forming apparatus.

2. Description of the Related Art

In an information processing system, an image forming apparatus as an export side transmits data to a server, the server transmits the data to an image forming apparatus as an import side, and the image forming apparatus as the import side receives and stores the data.

An image forming apparatus has a box function. In the box function, one or plural pieces of box data (document data or the like) is/are registered in each of one or plural boxes, a user can cause to display a list of boxes, to display a list of the box data in a desired box, and to perform displaying of the box data in a desired box (i.e. displaying a document based on the document data or the like).

When a box in such box function is exported from an image forming apparatus and imported to another image forming apparatus, the image forming apparatus as the import side is usually prevented from using the box until transmission of the box data is finished. Therefore, if the box includes lots of box data, transmission of the box data takes long time and consequently long time is required until the box becomes available and it causes low usability.

SUMMARY

An image forming system according to an aspect of the present disclosure includes a management server and an image forming apparatus as an import side having a box function. The management server (a) stores box data received from an image forming apparatus as an export side, (b) generates box configuration data that indicates the box data, (c) upon receiving an import request of the box data from the image forming apparatus as the import side, transmits the box configuration data to the image forming apparatus as the import side, and (d) transmits the box data to the image forming apparatus as the import side after the transmission of the box configuration data. The image forming apparatus as the import side (a) transmits the import request to the management server, (b) receives and saves the box configuration data and thereby registers the box configuration data to the box function, and (c) receives and saves the box data after the receipt and the saving of the box configuration data. The box function includes a function to display a list of the box data on the basis of the box configuration data. Further, the image forming apparatus as the import side displays the list of the box data regardless of whether the box data has been received or not after receiving and saving the box configuration data and thereby registering the box configuration data to the box function.

An image forming apparatus having a box function according to an aspect of the present disclosure includes a communication device, a control unit, and an import processing unit. The control unit is configured to perform an action of the box function. The import processing unit is configured to (a) transmit an import request of a box to a management server, (b) receive and save box configuration data of the box from the management server and thereby register the box configuration data to the box function, and (c) receive and save box data of the box after the receipt and the saving of the box configuration data. The box function includes a function to display a list of the box data on the basis of the box configuration data. Further, the control unit displays the list of the box data regardless of whether the box data has been received or not after receiving and saving the box configuration data and thereby registering the box configuration data to the box function.

These and other objects, features and advantages of the present disclosure will become more apparent upon reading of the following detailed description along with the accompanied drawings.

BRIEF DESCRIPTION OF THE DRAWINGS

FIG. 2 shows a block diagram that indicates configuration of a management server 1 and an image forming apparatus 4 shown in FIG. 1;

DETAILED DESCRIPTION

Figure 1:
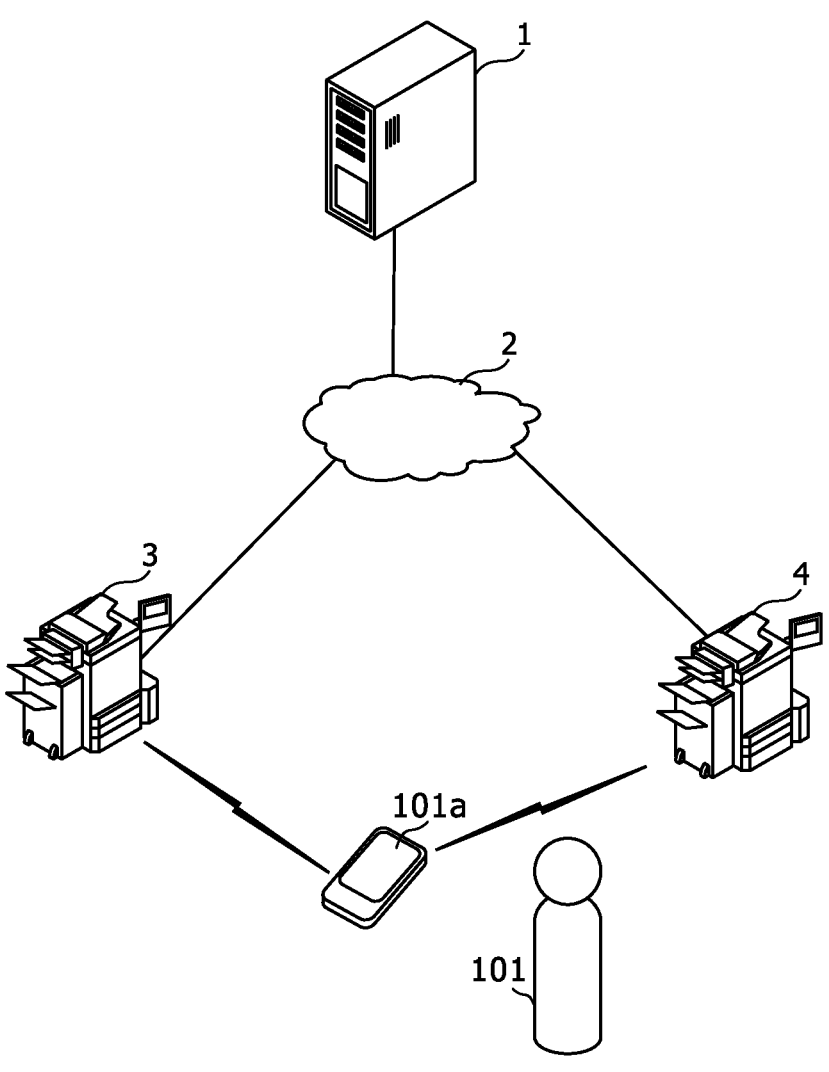
FIG. 1 shows a block diagram that indicates a configuration of an image forming system in an embodiment of the present disclosure.

Hereinafter, an embodiment according to an aspect of the present disclosure will be explained with reference to drawings.

a FIG. 1 shows a block diagram that indicates configuration of an image forming system in an embodiment of the present disclosure. In the system shown in FIG. 1, a management server 1 is connected to a network 2, and plural image forming apparatuses 3 and 4 are connected to the network 2. The network 2 includes a LAN (Local Area Network) such as intranet, a WAN (Wide Area Network) such as Internet, and/or the like. The image forming apparatuses 3 and 4 are printers, multi function peripherals or the like, and have box functions.

The system is enabled to perform transmission (export and import) of a box through the server 1 between the image forming apparatuses 3 and 4, and here, the image forming apparatus 3 is an image forming apparatus as an export side and the image forming apparatus 4 is an image forming apparatus as an import side. The management server 1 receives and stores box data of a box exported by the image forming apparatus 3, and as a response to an import request, transmits the box data to the image forming apparatus 4.

Figure 2:
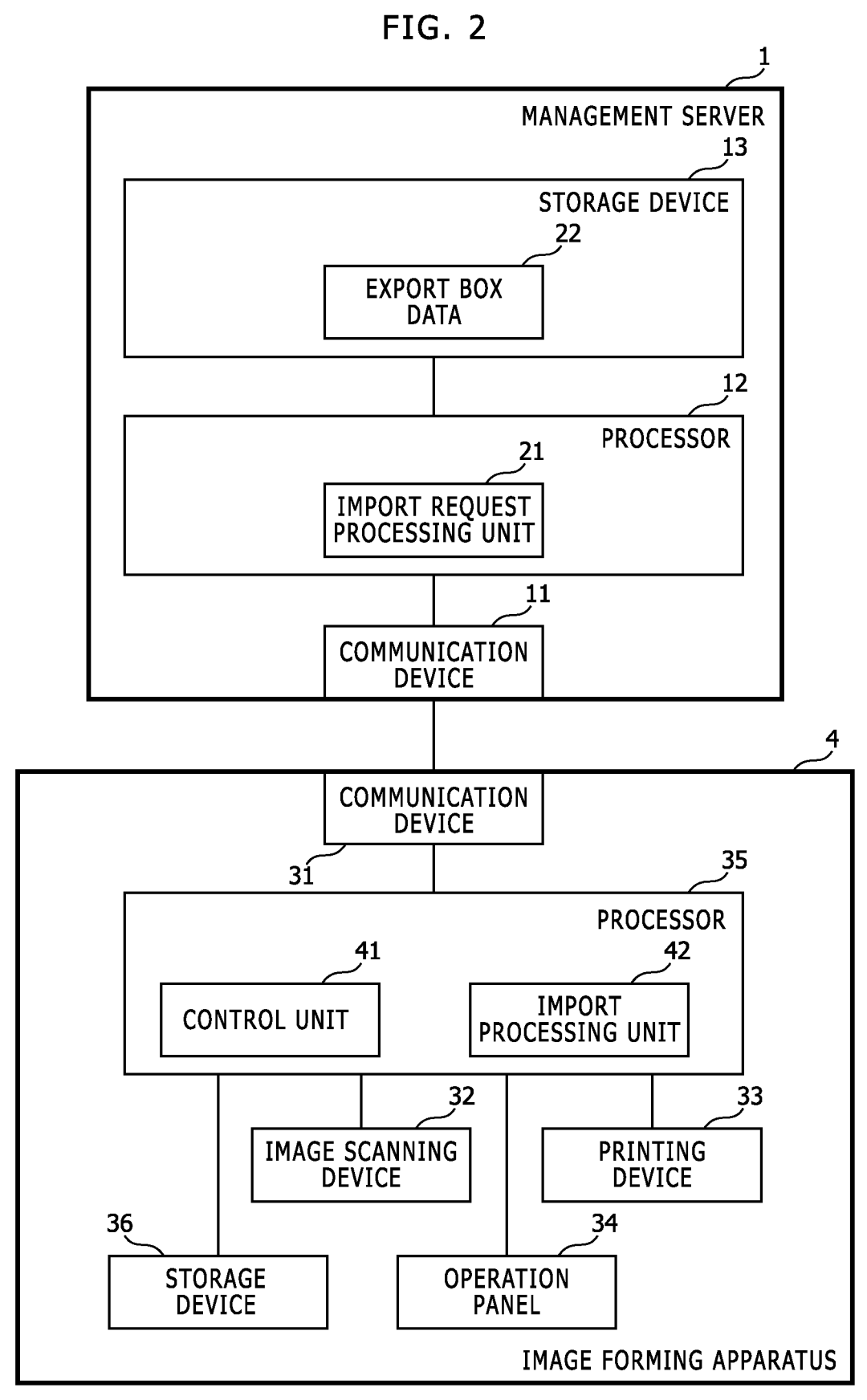

FIG. 2 shows a block diagram that indicates a configuration of the management server 1 and the image forming apparatus 4 shown in FIG. 1.

The management server 1 shown in FIG. 2 includes a communication device 11 such as a network interface, a processor 12 and a non-volatile storage device 13 that stores sorts of programs and data.

The communication device 11 is connected to the network 2 and performs data communication with another apparatus (the image forming apparatus 3 or 4 or the like) connected to the network 2.

The processor 12 includes a computer or the like that executes a predetermined program and acts as sorts of processing units. Here, the processor 12 acts as an import request processing unit 21. Further, export box data 22 received from the image forming apparatus 3 as an export side is stored in the storage device 13.

The import request processing unit 21 receives box data (document data or the like) from the image forming apparatus 3 as the export side using the communication device 11, and stores the box data as the export box data 22 into the storage device 13. Further, the import request processing unit 21 receives an import request of box data (the stored export box data 22) from the image forming apparatus 4 as an import side, and upon receiving the import request, generates box configuration data that indicates a configuration of this box data; transmits the generated box configuration data to the image forming apparatus 4 as the import side using the communication device 11; and transmits the box data to the image forming apparatus 4 as the import side using the communication device 11 after the transmission of the box configuration data.

The box configuration data is generated in a data format corresponding to a machine type of the image forming apparatus 4 as the import side.

Further, the image forming apparatus 4 shown in FIG. 2 includes, as internal devices, a communication device 31 such as network interface, an image scanning device 32, a printing device 33, an operation panel 34, a processor 35, and a non-volatile storage device 36 storing sorts of programs and data.

The communication device 31 is connected to the network 2 and performs data communication with another apparatus (the management server 1 or the like) connected to the network 2.

The image scanning device 32 optically scans a document image of a document and generates document image data of the document image. The printing device 33 prints an image based on image data onto a printing paper sheet, for example, in an electrographic manner.

The operation panel 34 includes a display device such as a liquid crystal display and/or an indicator, and an input device such as a touch panel and/or a hard key; and displays sorts of operation screens or dialogs to a user 101 using the display device and detects a user operation to the operation screen or the dialog using the input device.

The processor 35 includes a computer or the like that executes a predetermined program and acts as sorts of processing units. Here, the processor 35 acts as a control unit 41 and an import processing unit 42.

The control unit 41 receives a job request, and upon receiving the job request, performs a requested job using the aforementioned internal device. Further, the control unit 41 performs an action of the box function. Specifically, in accordance with a user operation, the control unit 41 performs displaying of a box list, displaying a list of box data in a box selected in the box list, displaying of box data selected in the list of the box data (specifically, displaying a document based on document data as the box data), and the like.

A list of box data included in a box is displayed on the basis of box configuration data of this box. For each of one or plural box data (document data) in a box, the box configuration data includes a document ID unique to the document data, a document property (document name, size, number of pages, and/or the like), a thumbnail image of the document, and the like.

Using the communication device 31, the import processing unit 42 (a) transmits an import request of a box desired by a user to the management server 1, (b) receives and saves incoming box configuration data transmitted from the management server 1 as a response to the import request and thereby registers the box configuration data to the box function (i.e. adds it to a box list), and (c) receives box data and saves the box data to the storage device 36 after receiving and saving the box configuration data.

Further, after receiving and saving the box configuration data and thereby registering the box configuration data to the box function, the control unit 41 displays a list of the box data when receiving a request (user operation or the like), regardless of whether the box data has been received or not.

Further, in this embodiment, if the box data selected in the displayed list of the box data has not been received and saved yet, the import processing unit 42 receives and saves the selected box data more preferentially than another box data in the displayed list of the box data, and upon saving the selected box data, the control unit 41 immediately performs displaying this box data.

Therefore, if import of plural boxes is requested and is performed parallelly or sequentially, when there is box data that has not been transmitted from the management server 1 to the image forming apparatus 4, transmission of the selected box data is performed prior to transmission of another untransmitted box data, and upon finishing the transmission of the selected box data, transmission of another untransmitted box data is performed.

Furthermore, in this embodiment, the import processing unit 42 (a) further transmits an import request of another box to the management server 1 using the communication device 31 in accordance with a user operation, and (b) if box data selected in the displayed list of the box data has not been received and saved yet, receives and saves the selected box data more preferentially than box data of a box other than a box of which a list of box data is displayed.

Therefore, if one or plural pieces box data of one or plural other boxes is/are being transmitted to the image forming apparatus, the transmission of the box data is suspended, the transmission of the selected box data is performed, and upon finishing the transmission of the selected box data, the suspended transmission of the box data is resumed.

Figure 3:
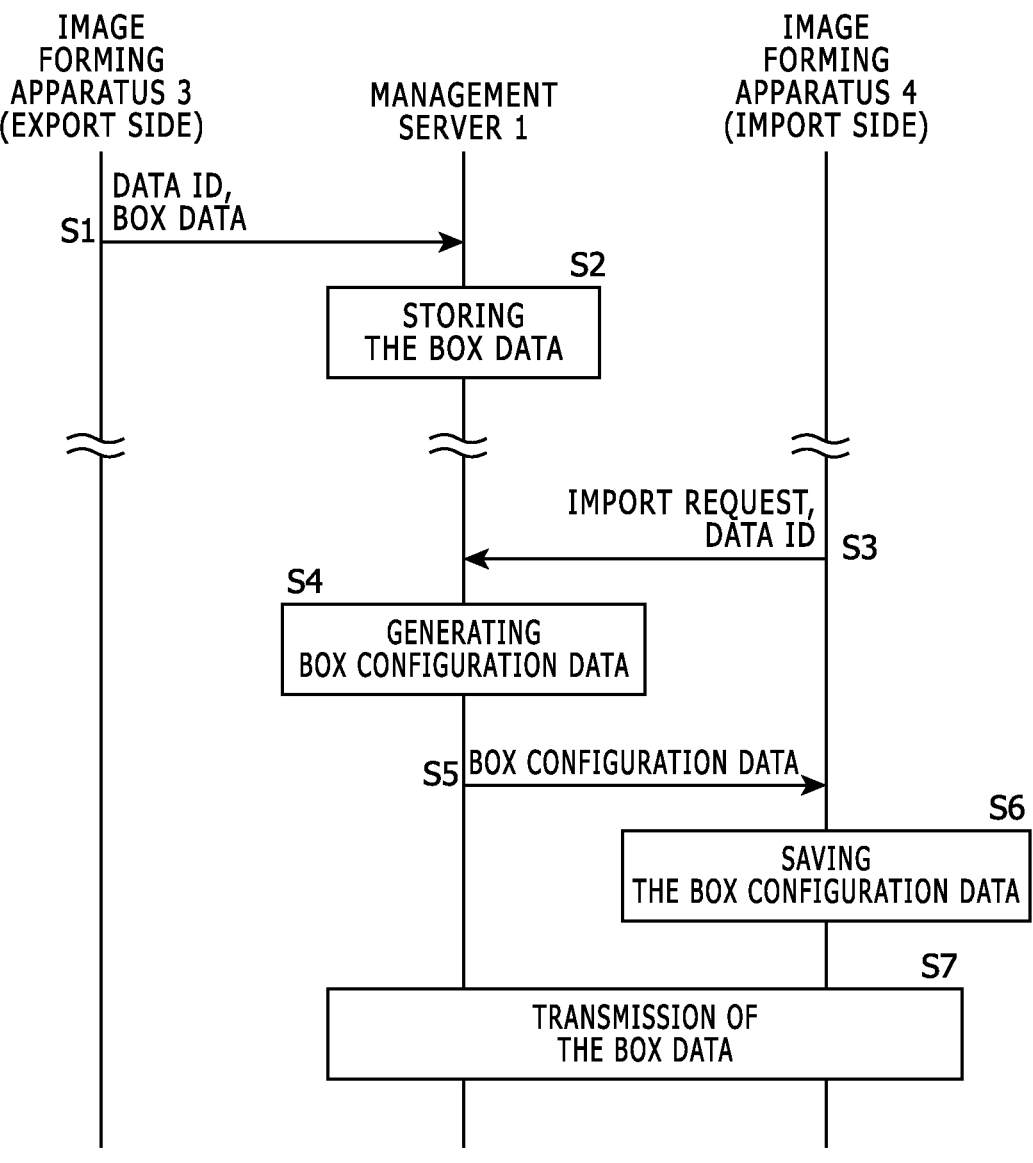
FIG. 3 shows a sequence diagram that explains a behavior of the image forming system shown in FIG. 1.

The following part explains a behavior of this image forming system. FIG. 3 shows a sequence diagram that explains a behavior of the image forming system shown in FIG. 1.

On the basis of a user operation to the image forming apparatus 3 or an instruction received from a terminal device 101a of a user 101 on the basis of a user operation, the image forming apparatus 3 transmits box data of a box specified by the user operation or the instruction together with data ID of this box (this box data) and notifies the user 101 of the data ID (in Step S1). The notification of the data ID is performed as displaying it by the image forming apparatus 3 or as message transmission to the terminal device 101a.

In the management server 1, the box data and the data ID are received and the box data is stored into the storage device 13 so as to associate with the data ID (in Step S2).

Afterward, the user performs a user operation to the image forming apparatus 4 as an import side or causes the terminal device 101a to transmit an instruction based on a user operation and thereby causes the image forming apparatus 4 to perform an import process of this box.

Specifically, the import processing unit 42 transmits an import request and a data ID of the box specified by the user to the management server 1 using the communication device 31 (in Step S3).

In the management server 1, the import request processing unit 21 receives the import request and the data ID using the communication device 11, and upon receiving the import request and the data ID, generates box configuration data of a box of the received data ID on the basis of the export box data 22 (in Step S4). Specifically, the import request processing unit 21 refers to a document ID and a document property included in each piece of box data 22 and thereby generates the box configuration data. Upon generating the box configuration data, the import request processing unit 21 immediately transmits the box configuration data to the image forming apparatus 4 using the communication device 31 (in Step S5).

In the image forming apparatus 4, the import processing unit 42 receives the box configuration data using the communication device 31, and upon receiving the box configuration data, saves the box configuration data to the storage device 36, and registers a box of the box configuration data to a box list (in Step S6).

After the transmission of the box configuration data, the import request processing unit 21 of the management server 1 transmits box data of the specified box (i.e. a box of the received data ID) to the image forming apparatus 4 using the communication device 11, and the import processing unit 42 of the image forming apparatus 4 receives and saves this box data using the communication device 31 (in Step S7).

Figure 4:
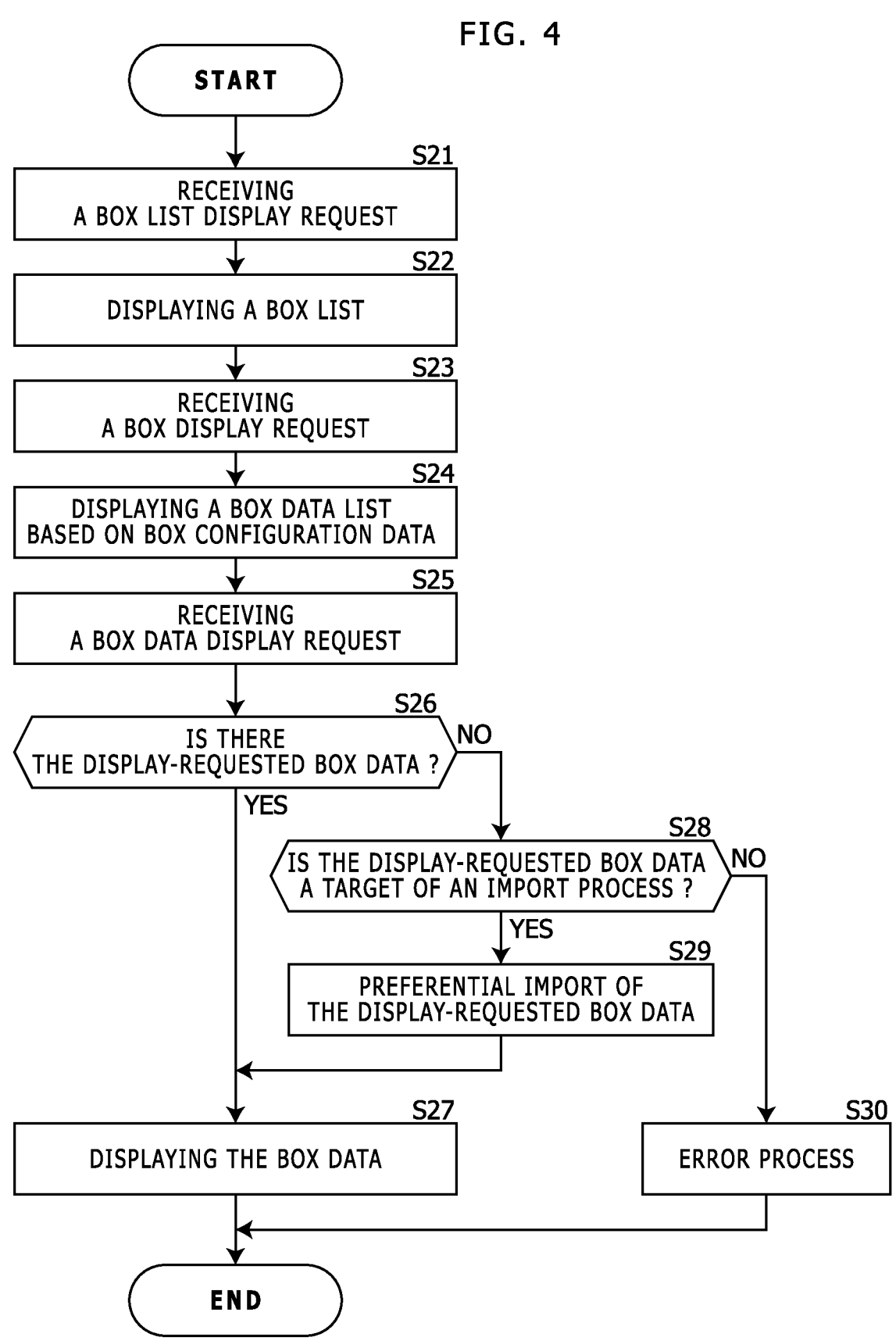
FIG. 4 shows a flowchart that explains a behavior of the image forming apparatus 4 as an import side in the image forming system shown in FIG. 1.

Here, a behavior of the image forming apparatus 4 as the import side is explained. FIG. 4 shows a flowchart that explains a behavior of the image forming apparatus 4 as the import side in the image forming system shown in FIG. 1.

In the image forming apparatus 4, upon receiving a box list display request based on a user operation of the user 101 (in Step S21), the control unit 41 displays on a display device of the operation panel 34 a box list of one or plural boxes registered in the box function (in Step S22).

Afterward, the user 101 selects one box in the displayed box list and performs a user operation for a box display request. Upon receiving the box display request based on the user operation (in Step S23), the control unit 41 displays a box data list of the selected box on the display device of the operation panel 34 (in Step S24). For example, in the box data list, a document ID, a document property, a thumbnail image and the like of each piece of the box data are displayed.

Afterward, the user 101 selects one piece of box data in the displayed box data list and performs a user operation for a box data display request. Upon receiving the box data display request based on the user operation (in Step S25), the control unit 41 determines whether the selected box data has been saved or not (in Step S26).

If the selected box data has been saved, the control unit 41 reads the box data and displays a document image based on the box data on the display device of the operation panel 34 (in Step S27).

Contrarily, if the selected box data has been not saved, the control unit 41 determines whether the selected box data is a target of the import process or not (in Step S28).

If the selected box data is a target of the import process, the import processing unit 42 preferentially performs transmission and saving of this box data (in Step S29), and after it the control unit 41 immediately display a document image based on the box data on the display device of the operation panel 34 (in Step S27).

Contrarily, if the selected box data is not a target of the import process, the control unit 41 performs an error process such as displaying an error message because the box data to be displayed does not exist (in Step S30).

As mentioned, in the aforementioned embodiment, the management server 1 (a) stores box data received from an image forming apparatus as an export side, (b) upon receiving an import request of the box data from the image forming apparatus 4 as an import side, generates box configuration data that indicates the box data, (c) transmits the box configuration data to the image forming apparatus 4 as the import side, and (d) transmits the box data to the image forming apparatus 4 as the import side after the transmission of the box configuration data. The image forming apparatus 4 as the import side has a box function and (a) transmits the import request to the management server 1, (b) receives and saves the box configuration data and thereby registers the box configuration data to the box function, and (c) receives and saves the box data after the receipt and the saving of the box configuration data. The box function includes a function to display a list of the box data on the basis of the box configuration data. Further, the image forming apparatus 4 as the import side displays the list of the box data regardless of whether the box data has been received or not after receiving and saving the box configuration data and thereby registering the box configuration data to the box function.

Consequently, the user can start a browsing operation of a box without waiting for finishing the transmission of the box data and therefore obtains high usability when importing a box.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system, comprising:
a management server; and
an image forming apparatus as an import side having a box function;
wherein the management server (a) stores box data received from an image forming apparatus as an export side, (b) generates box configuration data that indicates the box data, (c) upon receiving an import request of the box data from the image forming apparatus as the import side, transmits the box configuration data to the image forming apparatus as the import side, and (d) transmits the box data to the image forming apparatus as the import side after the transmission of the box configuration data;
the image forming apparatus as the import side (a) transmits the import request to the management server, (b) receives and saves the box configuration data and thereby registers the box configuration data to the box function, and (c) receives and saves the box data after the receipt and the saving of the box configuration data;
the box function includes a function to display a list of the box data on the basis of the box configuration data; and
the image forming apparatus as the import side displays the list of the box data regardless of whether the box data has been received or not after receiving and saving the box configuration data and thereby registering the box configuration data to the box function.

2. An image forming apparatus having a box function, comprising:

a communication device;

a control unit configured to perform an action of the box function; and an import processing unit configured to (a) transmit an import request of a box to a management server, (b) receive and save box configuration data of the box from the management server and thereby register the box configuration data to the box function, and (c) receive and save box data of the box after the receipt and the saving of the box configuration data;

wherein the box function includes a function to display a list of the box data on the basis of the box configuration data; and the control unit displays the list of the box data regardless of whether the box data has been received or not after receiving and saving the box configuration data and thereby registering the box configuration data to the box function.

3. The image forming apparatus according to claim 2, wherein the box function includes a function to display box data selected in the list of the box data; and if the box data selected in the displayed list of the box data has not been received and saved yet, the import processing unit receives and saves the selected box data more preferentially than another box data in the displayed list of the box data.

4. The image forming apparatus according to claim 2, wherein the box function includes a function to display box data selected in the list of the box data; and the import processing unit (a) further transmits an import request of another box to the management server, and (b) if box data selected in the displayed list of the box data has not been received and saved yet, receives and saves the selected box data more preferentially than box data of a box other than a box of which a list of box data is displayed.

* * * * *